F. R. VERNON.
KNOCKDOWN BOX.
APPLICATION FILED APR. 1, 1909.
976,318.
Patented Nov. 22, 1910.
2 SHEETS—SHEET 1.
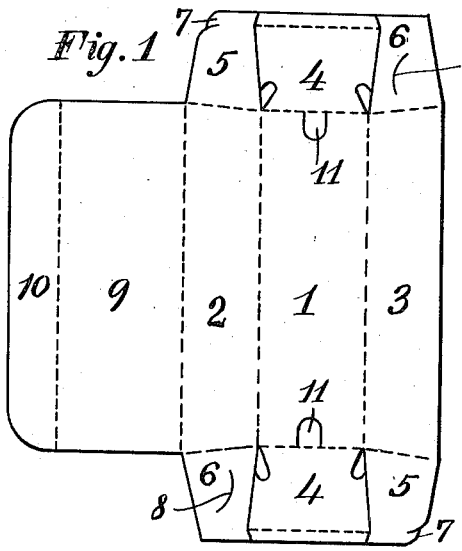
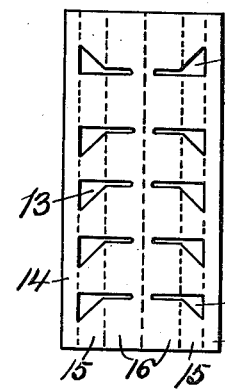
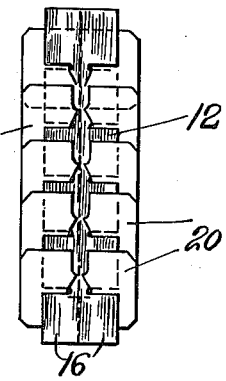
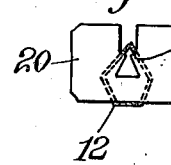
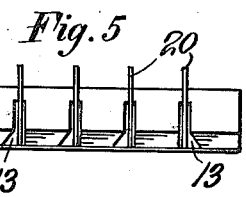
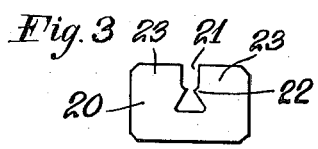
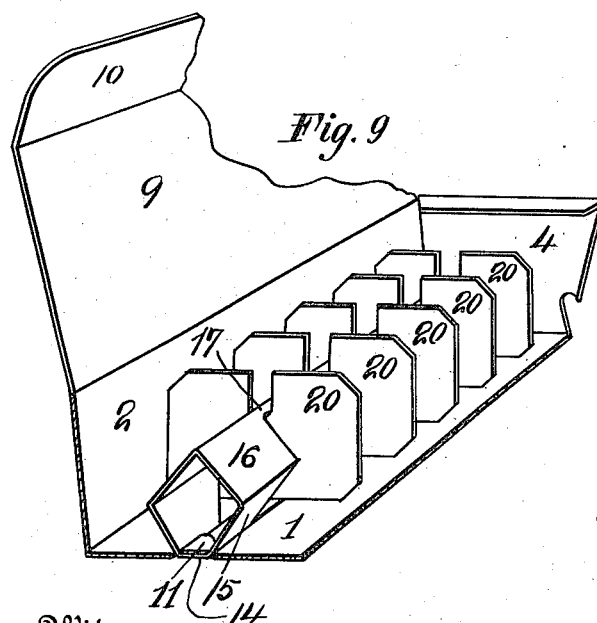
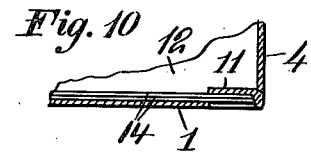
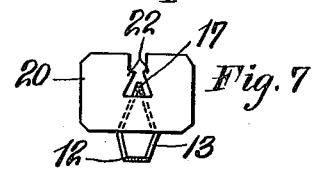
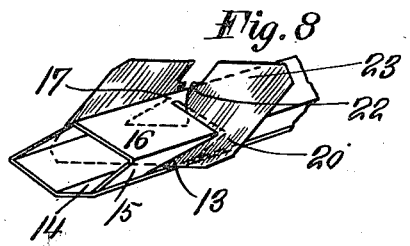
Witnesses
F. R. Vernon, Inventor
By his Attorneys

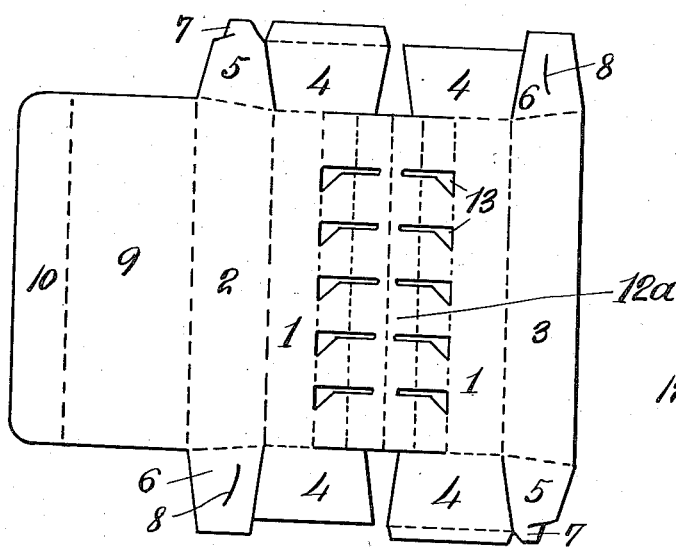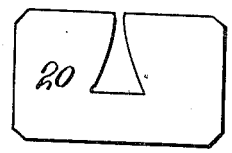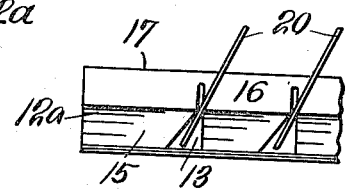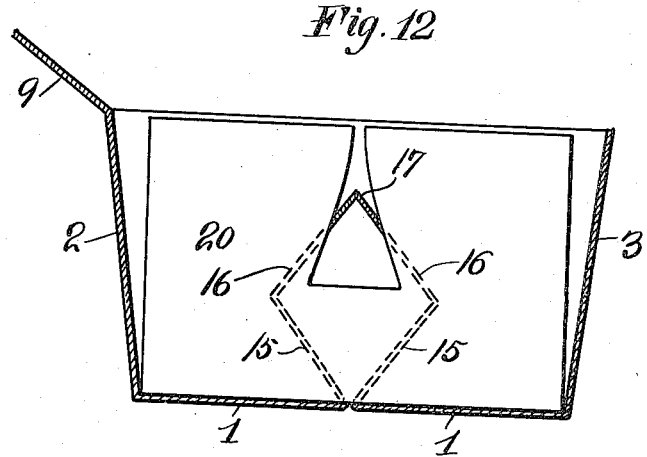

UNITED STATES PATENT OFFICE.

FREDERICK R. VERNON, OF FREEPORT, NEW YORK.

KNOCKDOWN BOX.

976,318. Specification of Letters Patent. Patented Nov. 22, 1910.

Application filed April 1, 1909. Serial No. 487,115.

*To all whom it may concern:*

Be it known that I, FREDERICK R. VERNON, a citizen of the United States, and a resident of Freeport, Nassau county, Long Island, State of New York, have invented certain new and useful Improvements in Knockdown Boxes, of which the following is a specification.

The invention relates particularly to that class of knockdown boxes used for packing eggs and like articles.

One of the objects of the invention is to produce a box with nests therein so arranged that the division pieces forming the nests will lie flat on the bottom of the box and can be quickly raised when the box is to be used, as the division pieces will remain in their raised positions.

Another object of the invention is to so construct the division pieces that they may be readily folded on the bottom of the box for nesting and shipping.

Other objects will appear from the hereinafter description.

The construction is illustrated in the accompanying drawings which form part of this application and in which the same reference character indicates the same part in the several views.

Referring to the drawings, Figure 1 is a plan view of a blank from which the box is constructed. Fig. 2 is a plan view of the blank from which the longitudinal division piece of the nests is constructed. Fig. 3 is one of the transverse division pieces. Fig. 4 is a plan view of the longitudinal division piece formed into shape and the transverse division pieces assembled and lying flat. Fig. 5 is a longitudinal section on line 5 of Fig. 4, showing the transverse division pieces in their raised position. Fig. 6 is a section on line 6—6 of Fig. 5. Fig. 7 is a transverse section of the longitudinal division piece showing one of the transverse pieces in its raised position for folding the nest on the bottom of the box. Fig. 8 is a perspective view showing the relative position of the parts when said nest is about to be folded. Fig. 9 is a perspective view with a side and an end of the box removed to more clearly show the construction and relative location of the longitudinal and transverse pieces forming the nest. Fig. 10 is a detail sectional view showing the manner of securing the nest in the box. Fig. 11 is a plan view of a blank to be used when the box and the longitudinal piece of the nest are made integral. Fig. 12 is a transverse section of the box formed of the blank shown in Fig. 1, with one of the transverse division pieces in place. Fig. 13 is a modified form of a division piece. Fig. 14 is a longitudinal section showing in detail the relative location of the transverse division pieces and the longitudinal division piece.

The part marked 1 on the drawing represents that part of the blank which forms the bottom of the box.

2 and 3 represent the pieces which form the sides of the box.

4, 5 and 6 represent end pieces which when folded form the ends of the box, these end pieces being held in position by the usual tongues 7 which are fitted in the slots 8.

9 is the piece which forms the top of the box and is provided with a piece 10 forming the overlapping edge thereof, all of which is of the usual construction. The bottom of the box is provided with tabs or tongues 11 formed by slitting the bottom of the box on the line indicated. The longitudinal division piece is made from the blank 12 and has cut-out portions 13. It is scored longitudinally as shown by dotted lines, forming the sections 14, 15 and 16.

20 represents the transverse division pieces each having a recessed portion 21 formed with inwardly projecting points or fingers 22. These transverse pieces are inserted from the bottom upward through the slots 13 in the blank 18, the wings 23 of said transverse pieces projecting through the cut-away portions 13 in the blank 12. The blank 12 is then folded on the dotted lines, the two sections 14 overlapping and fastened together by glue or any other means, forming a tube of rectangular cross section. The cross section of said tube is clearly shown in Fig. 6 and a transverse view thereof is shown in Figs. 8 and 9.

When the parts are thus assembled the nest is held in the box by the tabs 11 which fit over each end of the overlapping portions 14 of the longitudinal piece, as is more clearly shown in Figs. 9 and 10. To fold the nest on the bottom of the box it is only necessary to push the lower end of the transverse pieces in the enlarged portion of the cut-away part 13 of the box, whereupon the transverse piece can be folded on the scored lines and folded in the box, as shown in Fig. 4, the act of folding the parts being clearly illustrated in Fig.

8. When the nest is to be raised it is only necessary to pinch or squeeze together the sides of the longitudinal piece, whereupon it will rise from the bottom of the box and carry with it all of the transverse pieces, which pieces will take their vertical position. To prevent the nest being accidentally knocked down or folded in the box after it has been raised, the projections or fingers 22 take under that part of the longitudinal division piece marked 17, and will hold the division piece in its raised position, as shown in Figs. 6 and 9. After the nest is raised, in order to permit the longitudinal piece to be collapsed, it is necessary first to squeeze the sides of the longitudinal piece together and then raise each of the transverse pieces so that the projections 22 will be moved from underneath the part 17, as shown in Fig. 7, whereupon the longitudinal piece can be folded together with the transverse pieces, Fig. 4 showing the parts in the act of being collapsed or folded on the bottom of the box. Although preferable, it is not necessary to provide the transverse pieces with the projections 22. In Fig. 13, however, I have illustrated a transverse piece of different construction and without these projections.

Instead of making the longitudinal member of the nest of a separate piece, I may form it out of the bottom of the box itself. In Fig. 11 I have shown such a construction. In this construction the main portion of the blank is scored longitudinally on the lines indicated for folding, the part marked 1 forming the bottom of the box and 12ª the longitudinal member of the nest. The part 12ª is cut away as heretofore described. Fig. 12 shows the blank after being folded to form the box and the longitudinal member of the nest integral therewith. The longitudinal member in both constructions is such that the sides thereof may be easily squeezed together or forced apart to accommodate eggs of different sizes and to prevent the eggs from shaking about.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described and all statements of the scope of the invention, which, as a matter of language, might be said to fall therebetween.

Having now described my invention, what I claim as new and desire to secure by Letters Patent is:

1. In a box, a nest consisting of a longitudinal member polygonal in cross section and adapted to be folded on the bottom of the box, said tube having cut-away portions therein in which are fitted transverse members, said transverse members having recesses and projections in the recesses which engage with the tube and hold it in its raised position, and which when out of engagement with the tube permit all the members to be folded on the bottom of the box.

2. A box having the bottom thereof folded into a longitudinal member consisting of a tube polygonal in cross section, said member having recesses therein, and transverse members in said recesses.

3. A box having the bottom thereof folded to form a collapsible longitudinal tube polygonal in cross section, cut-away portions in said tube, transverse members in said recesses, said members having cut-away portions with projections extending therein, said projections engaging the cut-away portions of the tube and holding the same and the transverse members in a raised position in the box.

4. A box having the bottom thereof folded into a longitudinal member, consisting of a tube, said member having recesses therein and transverse members in said recesses.

5. In a box, a longitudinal member consisting of a tube having slots transverse thereof and transverse members in said slots.

6. In a box, a longitudinal member consisting of a collapsible tube having a transverse slot therein and a transverse member having a projection which engages with the tube when the parts are in their raised position to hold them in said position.

In witness whereof I have hereunto set my hand at the city of New York, county of Kings and State of New York, this 30th day of March, 1909.

FREDERICK R. VERNON.

In presence of—
ADA LIVINGSTON STRONG,
F. J. VERNON.